(12) United States Patent
Blodgett, Jr. et al.

(10) Patent No.: US 7,377,362 B2
(45) Date of Patent: May 27, 2008

(54) LIFT SYSTEM

(75) Inventors: Raymond W. Blodgett, Jr., Norco, CA (US); Benjamin J. Fletes, Victorville, CA (US)

(73) Assignee: RBW Industries, Inc., Chino, CA (US)

( * ) Notice: Subject to any disclaimer, the term of this patent is extended or adjusted under 35 U.S.C. 154(b) by 287 days.

(21) Appl. No.: 10/726,352

(22) Filed: Dec. 2, 2003

(65) Prior Publication Data

US 2004/0178399 A1    Sep. 16, 2004
US 2007/0290183 A9    Dec. 20, 2007

Related U.S. Application Data

(60) Provisional application No. 60/488,633, filed on Jul. 18, 2003, provisional application No. 60/430,425, filed on Dec. 2, 2002, provisional application No. 60/430,406, filed on Dec. 2, 2002.

(51) Int. Cl.
*B66B 9/02* (2006.01)
(52) U.S. Cl. ............... 187/267; 297/156; 297/170; 5/118; 187/222
(58) Field of Classification Search ............... 414/462, 414/463; 254/98, 89 R, 92, 100; 52/7 R, 52/105; 74/841; 248/188.4; 5/8, 9.1, 10.1, 5/10.2, 11, 118, 127; 296/156, 170; 187/200, 187/249, 251, 267, 414
See application file for complete search history.

(56) References Cited

U.S. PATENT DOCUMENTS

| | | | |
|---|---|---|---|
| 520,760 A | 5/1894 | Poor | |
| 527,095 A | 10/1894 | Wowra | |
| 533,013 A | 1/1895 | Milligan | |
| 533,031 A | 1/1895 | Breed | |
| 534,756 A | 2/1895 | Pearson | |
| 544,547 A | 8/1895 | Pearson | |
| 1,181,909 A * | 5/1916 | McFadden | 410/24 |
| 1,573,551 A * | 2/1926 | Klausmeyer | 408/234 |
| 2,187,390 A * | 1/1940 | Anderson et al. | 187/268 |
| 2,458,312 A * | 1/1949 | Stephen | 254/419 |
| 2,742,164 A * | 4/1956 | Francis | 414/237 |
| 3,266,062 A * | 8/1966 | Rogers | 5/118 |
| 3,651,965 A * | 3/1972 | Simonelli et al. | 414/540 |
| 4,252,491 A * | 2/1981 | Hock | 414/540 |
| 4,353,436 A * | 10/1982 | Rice et al. | 414/540 |
| 4,837,877 A * | 6/1989 | Hamada et al. | 5/10.2 |
| 5,020,169 A * | 6/1991 | Hamada et al. | 5/10.2 |
| 5,031,563 A * | 7/1991 | Matre | 114/188 |
| 5,036,951 A * | 8/1991 | Frangos | 187/214 |
| 5,154,569 A * | 10/1992 | Eryou et al. | 414/495 |
| 5,372,339 A * | 12/1994 | Morgan | 244/118.5 |
| 5,575,492 A | 11/1996 | Stone | |
| 5,845,590 A * | 12/1998 | Seidl | 108/147 |
| 5,915,913 A * | 6/1999 | Greenlaw et al. | 414/679 |

(Continued)

*Primary Examiner*—Peter M. Cuomo
*Assistant Examiner*—Stefan Kruer
(74) *Attorney, Agent, or Firm*—Inskeep IP Group, Inc.

(57) ABSTRACT

An improved RV lift mechanism according to the present invention. In one embodiment, the lift functions by way of an elongated, rotatably mounted acme screw. A bracket slides parallel to the acme screw, securing to an acme screw and an object to be lifted. The acme nut is threaded onto the acme screw and further held from rotation by the bracket. Thus, as the acme screw turns, it presses against the bracket, lifting or lowering both it and its payload.

18 Claims, 11 Drawing Sheets

U.S. PATENT DOCUMENTS

| | | | |
|---|---|---|---|
| 5,938,382 A * | 8/1999 | Andre et al. ................... 410/24 |
| 5,984,404 A | 11/1999 | Novoa et al. |
| 6,231,114 B1 | 5/2001 | Warmoth |
| 6,557,190 B2 | 5/2003 | Bailey |
| 6,557,431 B2 * | 5/2003 | Pawlak .................... 74/424.75 |
| 6,983,979 B2 | 1/2006 | Rasmussen |
| 7,347,484 B2 * | 3/2008 | Nebel ......................... 296/156 |

* cited by examiner

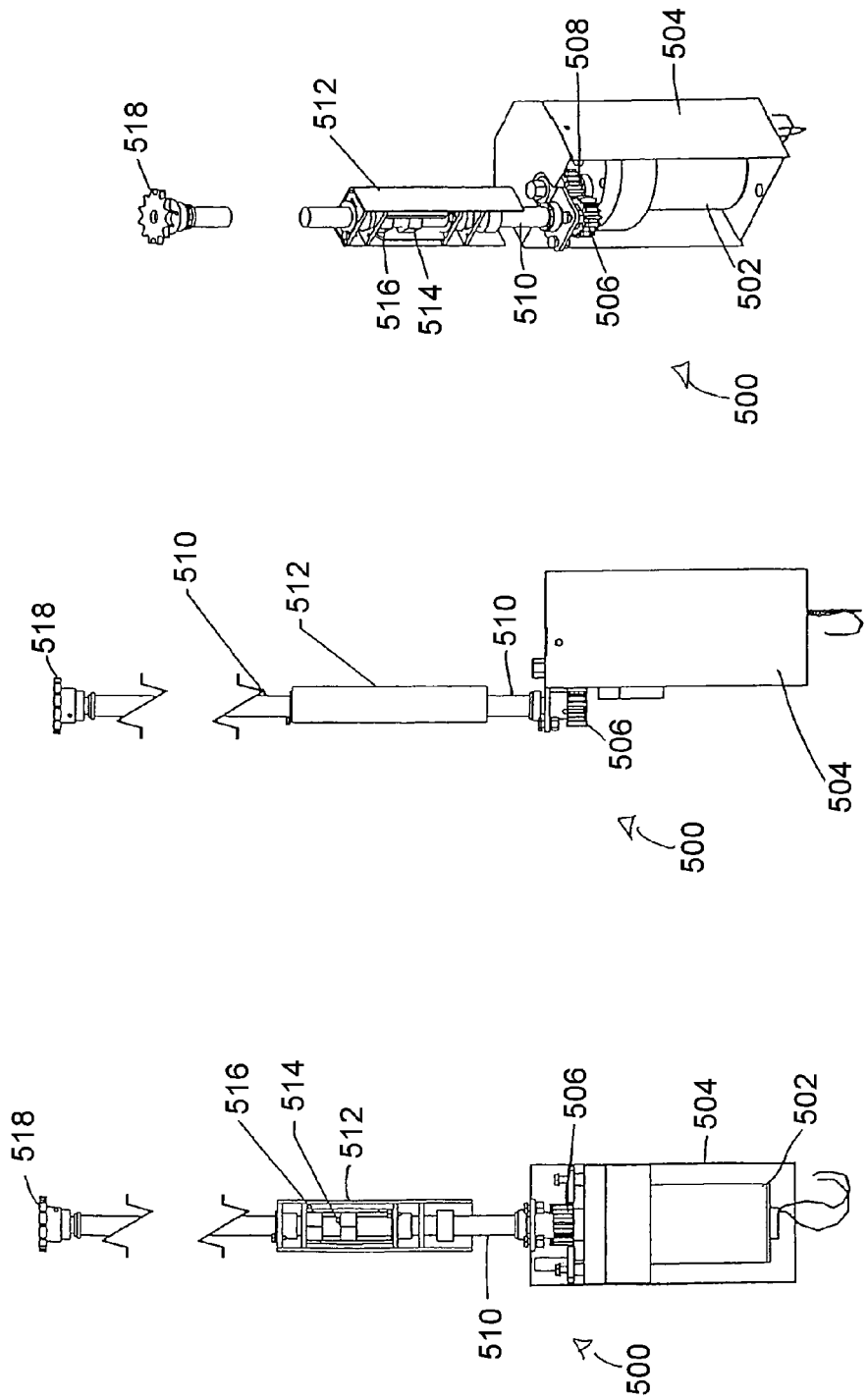

LIFT SYSTEM

CROSS REFERENCE TO RELATED APPLICATIONS

This application claims priority to U.S. provisional application Ser. No. 60/430,425 filed on Dec. 2, 2002 entitled Removable Motor Brake For Use With Vehicle Slide Out, and U.S. provisional patent application Ser. No. 60/488,633 filed Jul. 18, 2003 entitled Safety Device for Load Bearing Nut, the contents of which are incorporated herein by reference; and further claims priority to U.S. provisional application Ser. No. 60/430,406 filed on Dec. 2, 2002 entitled Shelf Lift For Use In Recreational Vehicles And Trailers.

BACKGROUND OF THE INVENTION

In recreational vehicles and trailers (collectively, "RV's"), there is an ever present need for lifting mechanisms. While such lifting devices are rarely a necessity in RV's, they nevertheless maintain an important functional role with respect to space maximization, storage, and RV jacks.

Generally, RV's are constrained in size by their safety to drive, ease to maneuver, and affordability to the average traveler. Further, RV manufacturing companies have strived to provide the greatest number of features in the least amount of space. Consequently, improvements have been made over the years to increase the amount of usable space within the vehicle.

Some designs attempt to maximize space by way of lifting devices. Thus, to the extent feasible, the used space can be convertible for dual or even multiple purposes by lifting furniture or other objects out of the way.

One of the largest pieces of furniture within an RV is the bed. Many designers have maximized usable space by designing a bed that lowers and raises within an RV. Examples of such designs include U.S. Pat. Nos. 6,557,190, 6,231,114, 5,984,404, 3,266,062, all herein incorporated by reference.

Additionally, couches, chairs, tables and storage containers may be secured to a lift system to allow for convertible or dual use space. In a similar fashion, these objects may be secured to a lift mechanism which provides for a lowered, in use position, and a stowed, raised position.

Lifting devices are also valuable outside an RV in the form of a retractable RV jack as seen in U.S. Pat. No. 4,865,295, herein incorporated by reference. Retractable RV jacks are of invaluable use for support of such trailer vehicles as "fifth wheel" hitch RV trailers, allowing a user to maintain an upright position to the trailer after unhitching it from a truck. Retractable RV jacks are also useful for jack stability supports, as seen in U.S. Pat. No. 5,575,492, herein incorporated by reference. These retractable angle supports provide additional vertical and horizontal stability to an RV or RV trailer when in a nonmoving, parked position.

While functional, these lift devices are often highly specialize for their individual tasks. As specialization in design and parts increase, total cost of the lift mechanism also increases. Further, reliability may also suffer as a result of poor specialized designs and unproven component reliability.

Additionally, these lift devices often lack safety mechanisms integrated into these often heavy lifting mechanisms. Lack of such redundant safety mechanisms leaves the RV and all property in it at risk to damage in the event of lift failure. Further, users risk significant damage to themselves, family, or other visitors to the vehicle.

Lastly, these lift devices lack safety indicators to alert them to component failure on the lift devices. Such visual indicators would allow for quick and easy visual detection of failure of a primary component to the lifting device.

BRIEF SUMMARY OF THE INVENTION

It is an object of the present invention to provide an improved lifting device capable of being adapted for a wide variety of purposes associated with an RV.

It is a further object of the present invention to provide an improved lifting device having a redundant safety feature which prevents damage in the event of lift component failure.

It is a further object of the present invention to provide an improved lifting device having visual safety indicators that warn a user of failure of components within the lift.

It is another object of the present invention to provide an improved lifting device for an RV that overcomes the disadvantages of the prior art. Further advantages will become apparent after reading the detailed description of the invention below.

The present invention achieves these objects by providing an improved lift mechanism according to the present invention. In one embodiment, the lift functions by way of an elongated, rotatably mounted acme screw. A bracket slides parallel to the acme screw, securing to an acme screw and an object to be lifted. The acme nut is threaded onto the acme screw and further held from rotation by the bracket. Thus, as the acme screw turns, it presses against the bracket, lifting or lowering both it and its payload.

BRIEF DESCRIPTION OF THE DRAWINGS

FIG. 20 illustrates a side view of an embodiment of a motorized bed lifting device according to the present invention;

FIG. 21 illustrates a side view of the embodiment of FIG. 20;

FIG. 22 illustrates a perspective view of the embodiment of FIG. 20;

DETAILED DESCRIPTION OF THE INVENTION

RV Lifting Device

An improved RV lifting device is provided in accordance with the present invention. Generally speaking, the lifting device uses a captured acme nut threaded onto an elongated acme screw. By rotating the acme screw, the captured acme nut pushes a lifting bracket upward or downward. Such a lifting device may be utilized for a variety of different purposes, including raising and lowering furniture or acting as a jack stand for a fifth wheel trailer.

Figure 1:
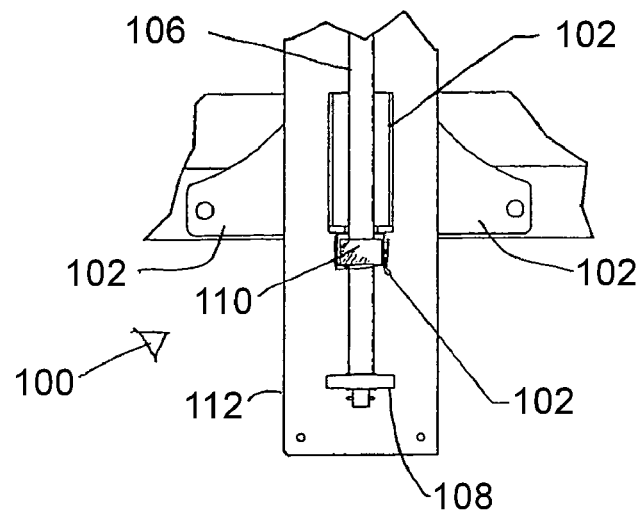
FIG. 1 illustrates a side view of an embodiment of a lifting device according to the present invention.
Figure 1A:
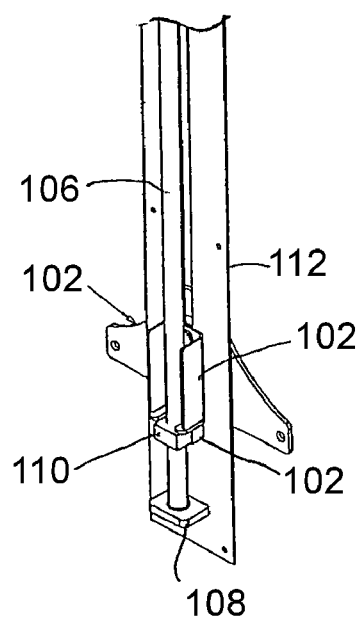
FIG. 1A illustrates a perspective view of the embodiment shown in FIG. 1.
Figure 2:
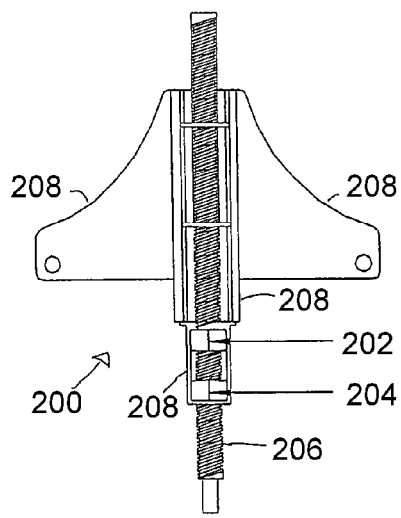
FIG. 2 illustrates a side view of another embodiment of a lifting device with a safety mechanism according to the present invention.
Figure 3:
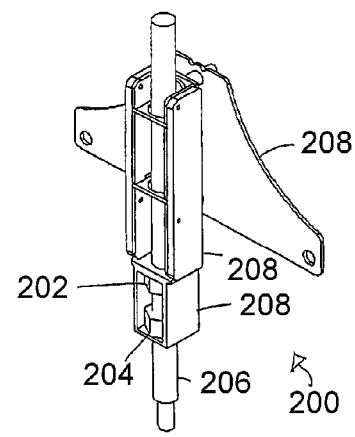
FIG. 3 illustrates a perspective view of the embodiment of FIG. 2.

Looking to FIGS. 1 and 1A, an embodiment of a lifting device of the present invention is shown. This general lifting device 100 functions by way of an elongated acme screw 106 which mounts to support bracket 112 by an acme screw mounting bracket 108. The acme screw mounting bracket 108 serves to hold the acme screw 106 to the support bracket 112, while allowing it to freely rotate.

An additional bracket can been seen in this embodiment: the acme nut bracket 102. As the name implies, the acme nut bracket 102 serves to "capture" an acme nut 110 which has been threaded over the acme screw 106. In other words, the acme nut bracket 102 prevents the acme nut 110 from freely rotating when the acme screw 106 rotates, thus allowing the acme nut 110 to travel along the length of the acme screw 106 during rotation. The acme bracket 102 further allows this embodiment to lift a desired piece of furniture, portion of an RV, or other object associated with recreational vehicles generally. This is accomplished by securing the lifting portion of acme nut bracket 102 to the desired object to be lifted. Thus, as the acme nut bracket travels along the length of the acme screw 106, the acme nut bracket 102 also travels, moving any object attached to it.

A variety of securing methods may be used to secure the object to the acme nut bracket 102, including rivets, bolts, flanged lips, shelves and even nails. Different securing methods may be desired, depending on the nature of the object to be lifted.

Note that while this embodiment presents a single bracket 102 to both capture the acme nut 110 and secure to the object, multiple brackets may be used for this purpose. For example, an acme nut bracket could be used to capture the acme nut, and a lifting bracket could be used for securing the payload/object to be lifted. The two brackets could then be mounted together to act as a single bracket.

The acme screw 106 may be rotated by a variety of devices such as a manual crank, pull chain, or motor. Although no rotational mechanism is illustrated in FIGS. 1 and 1A, examples of such mechanisms will be illustrated and discussed in further embodiments of the present invention below.

RV Lifting Device With Safety Features

FIGS. 2-5 illustrate another embodiment of a lifting device according to the present invention. While the overall design of this embodiment is similar, it utilizes a dual acme nut design that allows for increased safety advantages as will be apparent below.

Safety lifting device 200 functions in a similar manner to the previous embodiment shown in FIGS. 1 and 1A. Namely, an acme nut bracket 208 "captures" two acme nuts while also securing the object to be lifted.

The primary difference of this embodiment lies in the use of a primary acme nut 202 and a secondary acme nut 204. Both acme nuts are "captured" by the acme nut bracket 208 and both acme nuts 202, 204 are threaded onto the elongated acme screw 206. However, the weight that the acme nut bracket 208 carries (from the weight of lifting an object secured to the bracket) falls exclusively on the top surface of the primary acme nut 202. In normal operation, the secondary acme nut 204 carries no weight from the acme nut bracket 208 nor indirectly from the object that is being lifted.

Figure 4:
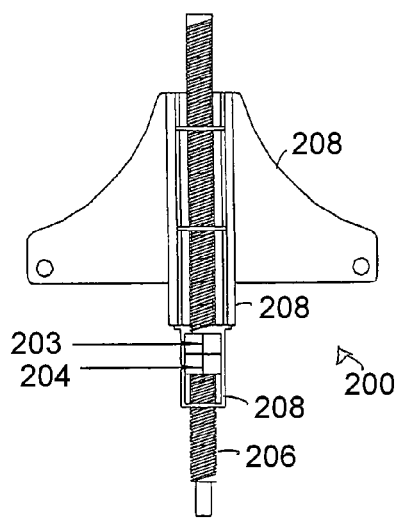
FIG. 4 illustrates a side view of another embodiment of a lifting device with a failed primary nut according to the present invention.
Figure 5:
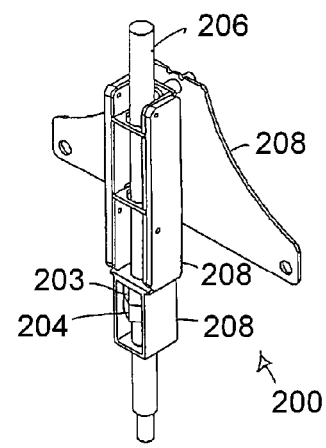
FIG. 5 illustrates a perspective view of the embodiment of FIG. 4.

Over time, continued use and excessive weight may cause the primary acme nut 202 to fail. Usually, these failures are due to stripping of the primary acme nut 202 threads. At this point, the embodiment of FIGS. 1 and 1A would completely fail, dropping the lifted load and likely causing substantial damage to a user or the RV itself. However, in this present embodiment, the acme nut bracket 208 merely falls onto the secondary acme nut 204, as illustrated in FIGS. 4 and 5. Thus, instead of a load falling as much as several feet, it may drop by only several centimeters, preventing damage and injury. At that point the secondary acme nut 204 supports the weight of the acme nut bracket 208, while allowing the safety lifting device 200 to operate normally.

Visual Indicator

FIGS. 6-9 illustrate the previously described embodiment of the safety lifting device 200, further including dual lifting devices 200 and a visual indicator 220. This visual indicator 220 serves to alert a user of a failure of the primary acme nut 202.

As described above, the safety lifting device 200 has a primary acme nut 202 which normally supports all of the weight of the acme nut bracket 208 and indirectly the bracket's payload. If the primary acme nut 202 should fail, the acme nut bracket 208 falls to the secondary acme nut 204. Consequently, both the acme nut bracket 208 and the bracket's payload will sit lower relative to the secondary acme nut 204 then if the primary acme nut 202 had not failed. FIGS. 4 and 5 illustrate this concept best.

Referring once again to FIGS. 6-9, a visual indicator 220 is provided as a vertical elevation guide and benchmark to evaluate the vertical location of the brackets, and thus primary acme nut 202 failure.

This visual indicator 220 may be located on a back wall, the support bracket 216, or other fixed object. Preferably, the visual indicator 220 will align with a portion of the safety lifting device 200 in a fully elevated or fully lowered position. In this fashion, the safety lifting device 200 is at an absolute position where its height can be compared to the visual indicator 220.

Figure 6:
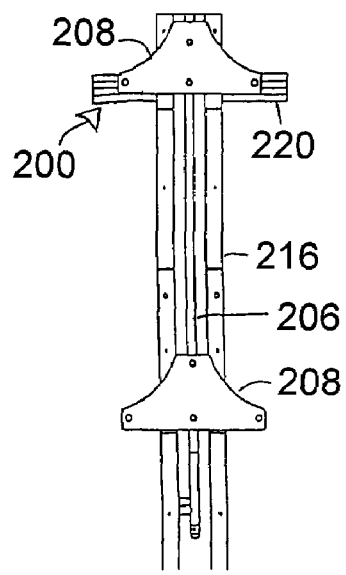
FIG. 6 illustrates a side view of an embodiment of a bed lifting device according to the present invention.
Figure 7:
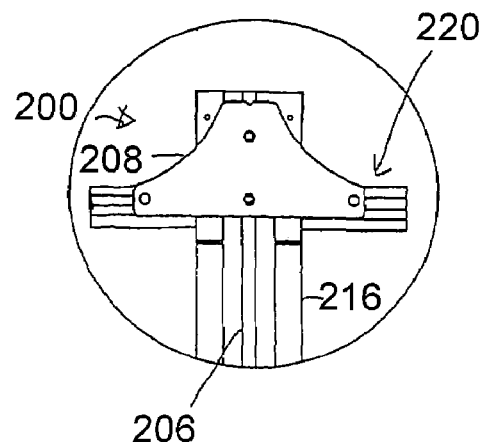
FIG. 7 illustrates a magnified view of the embodiment of FIG. 6.

FIGS. 6 and 7 illustrate the safety lifting device 200 in a fully elevated position with a functional primary acme nut 202. Note that the safety lifting device 200 normally aligns to a predetermined level on the visual indicator 220.

Figure 8:
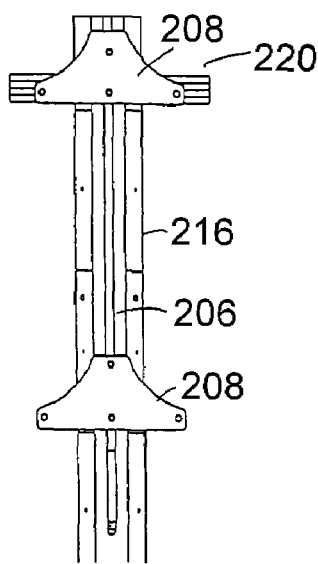
FIG. 8 illustrates a side view of an embodiment of a bed lifting device according to the present invention.
Figure 9:
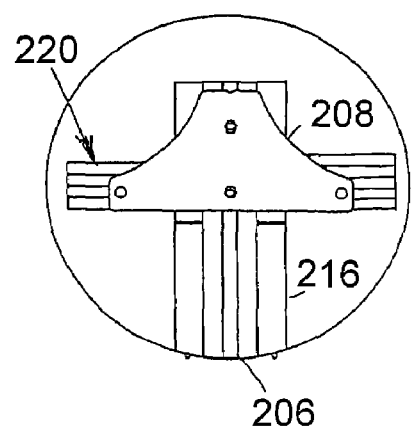
FIG. 9 illustrates a magnified view of the embodiment of FIG. 8.

FIGS. 8 and 9 illustrate the safety lifting device 200 again in a fully elevated position, but this time having a failed primary acme nut 202. Instead, the secondary acme nut 204 supports the weight associated with the safety lifting device 200 and is relatively lower when compared against the measuring marks of the visual indicator 220. Thus, by raising the failed safety lifting device 200 to the fully elevated position, a user may easily determine whether primary acme nut 202 has occurred based on the alignment level of the acme nut bracket 208 with the visual indicator 220.

Manual Bed Lifting Device

Figure 11:
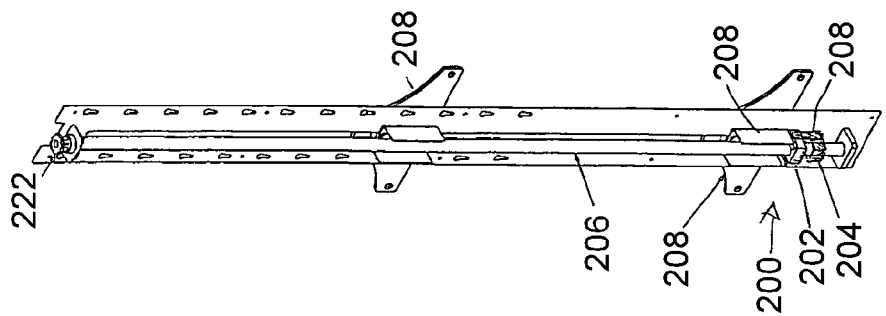
FIG. 11 illustrates a perspective view of the lifting device in FIG. 10.
Figure 10:
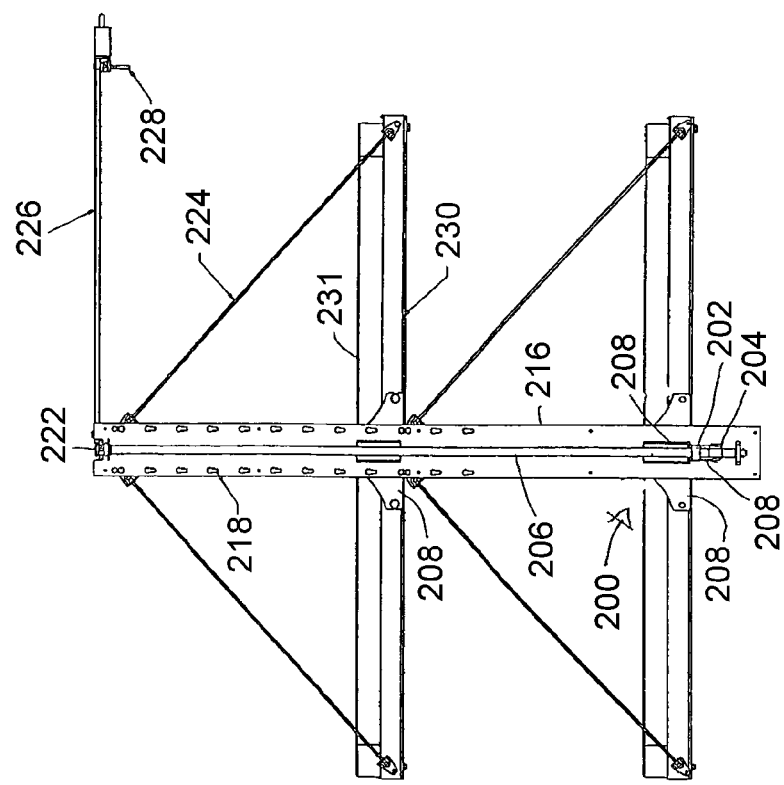
FIG. 10 illustrates a side view of an embodiment of a bed lifting device according to the present invention.
Figure 12:
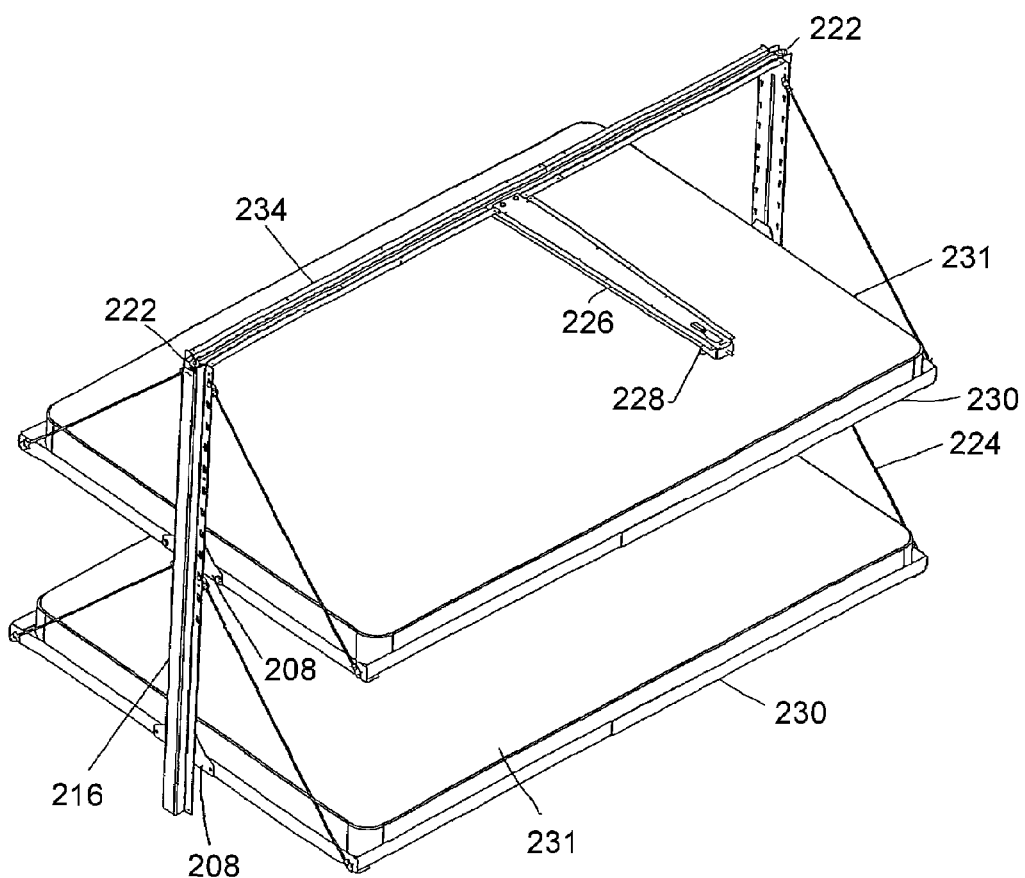
FIG. 12 illustrates a perspective view of the bed lifting device of FIG. 10.
Figure 14:
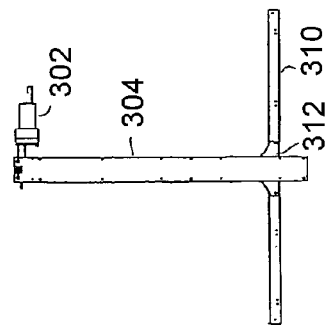
FIG. 14 illustrates a side view of the embodiment of FIG. 13.
Figure 16:
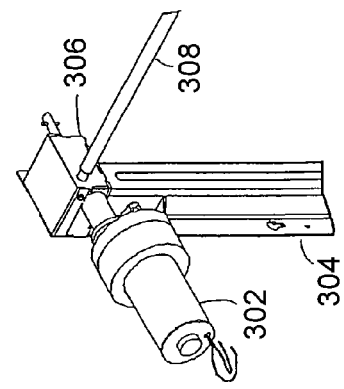
FIG. 16 illustrates a magnified perspective view of the motor from FIG. 13.

FIGS. 10-12 illustrate the safety lifting device 200 used as a bed lift. In this embodiment of the present invention, two safety lifting devices 200 are employed for use on a single acme screw 206, allowing two secured bunk beds 231 to be lifted and lowered by a user.

The safety lifting device 200 of this embodiment functions in much the same way as previous embodiments. Captured acme screws ride up and down the rotatably mounted acme screw 206, moving the attached beds upward or downward, depending on the direction of the acme screw 206 rotation.

The acme screw 206 is mounted at each of its ends to the support bracket 216. At the top end of the acme screw 206 is a chain sprocket 222 securing a chain (not shown). This chain extends along cross bar 234 to a second chain sprocket 222 on the opposite side, then across the crane 226. Each end of the chain terminates at chain opening 228 with a chain handle (not shown) on each end of the chain. This design allows a user to pull either chain handle and thus the chain, which rotates the chain sprocket 222 and consequently the acme screw 206. By pulling one handle, the acme screw 206 will be rotated in one direction, while pulling the other handle rotates the acme screw 206 in the opposite direction.

As previously described, the safety lifting device 200 is composed of a primary acme nut 202 and a secondary acme nut 204, both of which are held from rotation by the acme nut bracket 208. In turn, the acme nut bracket 208 secures bed frame 230.

The acme nut bracket 208 serves as a primary point of attachment to the bed frame 230. In addition to the support of the acme nut bracket 208, guide wires 224 are fixed to each corner of the bed frame 230 on one end and to key holes 218 located on the support bracket 216 on the other. These guide wires 224 provide additional support and a further safety mechanism for the bed lifting device.

Since guide wires 224 have metal key-shaped or hook-shaped ends, they easily fit within any of the key holes 218 in order to adjust to a suitable height. The guide wires 224 may be composed of cables, belts, or similar elongated structures, so long as they provides support to the lift while maintaining enough flexibility to allow the safety lifting system 200 to move upward.

To lift the beds 231, a user merely pulls one of the chain handles located at chain opening 228. This moves the chain in one direction, rotating the acme screws 206, and consequently moving the acme nuts up the acme screws 206. To lower the bed, user simply pulls the other end of the chain from the chain opening 228. This causes the acme screws 206 to rotate in the opposite direction, moving the acme nuts down the acme screws 206.

The embodiment shown in FIGS. 10-12 employs the safety lifting device 200 for the bottom bed only. The top bed freely slides along support bracket 216 independently of acme screw 206, in this case being supported by guide wires 224. As the lift device 200 is actuated, the bottom bed is lifted upwards toward the top bed. As the bottom bed reaches the top bed, it begins to push the top bed upwards until both beds reach to top of support bracket 216.

To lower the beds, the lift device 200 is once again actuated, causing both bunks to lower. Gravity pushes the top bed down along support bracket 216 until it is stopped by the force of guide wires 224. The bottom bed continues to move downward until it reaches the end of acme screw 206.

Although this embodiment illustrates the top bunk without a lift mechanism 200, it should be understood that the top bed may also have a lift mechanism 200 to raise and lower itself.

Motorized Bed Lifting Device

FIGS. 13-16 illustrate a similar safety bed lift device as mentioned above, with the exception of modifications to allow the safety bed lift device to be operated by a motor.

Figure 13:
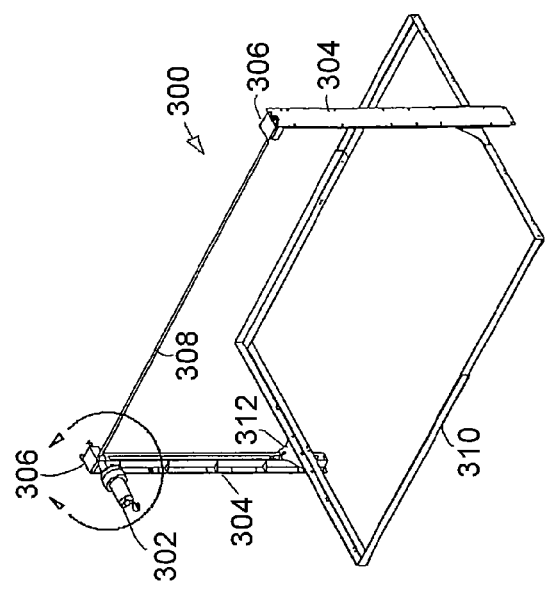
FIG. 13 illustrates a perspective view of an embodiment of a motorized bed lifting device according to the present invention.
Figure 15:
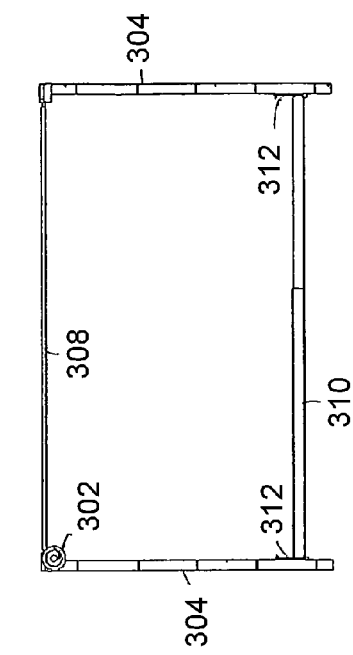
FIG. 15 illustrates a side view of the embodiment of FIG. 13.

The motor 302 drives the motorized bed lifting device from the top of support bracket 304. The energy of motor 302 is transferred by way of two gear boxes 306 and a cross shaft 308. As seen in FIG. 13, each gear box 306 mounts atop a support bracket 304, allowing the internal gearing to couple with the elongated acme screw (not shown) running along each of the support brackets 304 and with the cross shaft 308. The cross shaft 308 rotates, transferring the movement of one gear box 306 to the other. Thus, as the motor 302 motivates one gear box 306, the cross shaft 308 transfers that motive force to the other gear box 306, allowing both acme screws to rotate as the same rate, in unison.

In this manner, when a user actives the motor, each lifting bracket 312 and further each side of bed bracket 310, will raise or lower at the same speed.

FIGS. 20-22 illustrate an alternative motor positioning for the above described bed lifting bracket. In this embodiment, the motor 502 serves the same purpose as the previous embodiments, to drive the lifting or lowering of a bed bracket.

The motor 502 transfers power to the acme screw 510 through a drive shaft gear 508 mounted to the drive shaft of motor 502. In turn, acme gear 506 couples to the drive shaft gear 506, allowing it to rotate the acme screw 510.

The acme capture bracket 512, primary acme nut 516, and secondary acme nut 514 function in the same manner as mentioned above. As motor 502 rotates acme screw 510, the captured primary acme nut 516 pushes the acme nut capture bracket 512 upwards or downwards along the screw.

As is apparent, this lower positioning of motor 502 ultimately results in similar functionality as previously mentioned embodiments.

Secondary Safety Support Devices

While the lifting devices above provide increased safety for users, additional safety mechanisms may be used to enhance safety further. Guide wires 224 and support latch 600 provides two such examples of these additional safety mechanisms.

Looking to FIGS. 10 and 12, one embodiment of the guide wires 224 may be seen. Here the guide wires 224 are fixed to each corner of the bed frame 230 on one end, while the other end locks into key holes 218 located on support bracket 216. Since guide wires 224 have metal key-shaped or hook-shaped ends, they easily fit within any of the key holes 218 in order to adjust to a suitable height. The guide wires 224 may be composed of cables, belts, or similar elongated structures so long as they provide support to the lift while maintaining enough flexibility to allow the safety lifting system 200 to move upward without detaching the wires 224. In this fashion, the guide wires 224 provide additional support to the bed frame 230 or any similar shelf-like platform.

Looking to FIGS. 23-25B, one embodiment of the support latch 600 can be seen. Support latch 600 offers a one way roll bar latch designed to let the lifted object pass upward past the latch, but prevent passage downward past the latch until a user manually releases the latch.

The latch 600 is composed of two main parts: the latch mount 602 and the tongue 608. The latch mount 602 fastens to a fixed location 618 such as an adjacent wall or lift support framework. It's structure consists of a panel having vertical fins extending perpendicularly outward. Both fins have a curved slot 606 and a roll bar 604. The roll bar 604 extends across the latch mount 602, through both curved slots 606. The end of roll bar 604 radially flange outward, allowing the roll bar 604 to remain within the confines of the curved slots 606.

Figure 23:
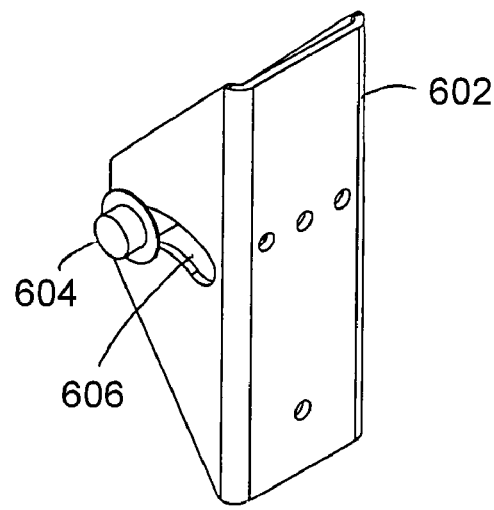
FIG. 23 illustrates a perspective view of an embodiment of a safety latch according to the present invention.
Figure 23A:
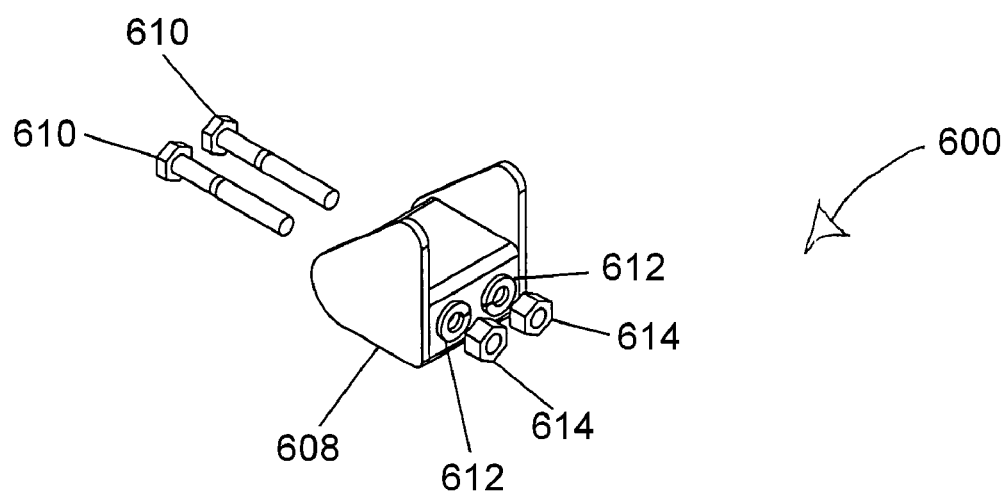
FIG. 23A illustrates a perspective view of an embodiment of a tongue for the safety latch of FIG. 23.

Referring to FIG. 23A, the tongue 608 mounts to any moving part of the lift mechanism so long as that moving part is capable of mounting the tongue 608 and supporting the weight of the object. Such mounting positions may include a bed frame, a shelf frame, a shelf, or even the object to be lifted. Tongue 608 mounts with two mounting bolts 610, washers 612, and locking nuts 614. In the present embodiment, the tongue 608 has an overall triangular shape, with an upper surface angled away from the object it's mounted to and a flat bottom surface. The tongue 608 is mounted parallel to latch mount 602, allowing the tongue 608 to pass between the fins of the latch mount 602 as the tongue 608 moves upward with the lift.

Figure 24A:
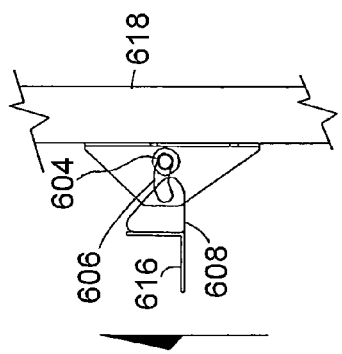
FIGS. 24A-24C illustrate a side view of the embodiment of FIG. 23.
Figure 24B:
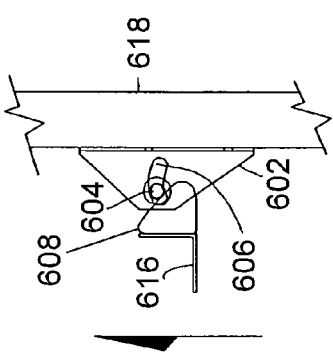
Figure 24C:
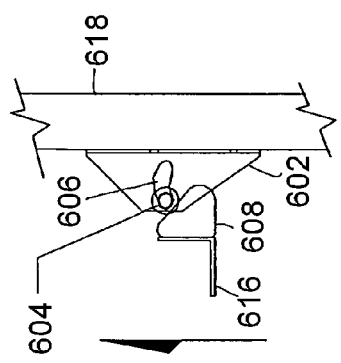

FIGS. 24A-24C illustrate the latch 600 in operation as the lift device moves upward. The tongue 608 moves upward with the lift device as the angled upper surface of tongue 608 presses against roll bar 604. Since the tongue 608 is angled towards the latch mount 602, the roll bar 604 is pushed away from the tongue 608, allowing the tongue 608 and the rest of the lift to pass the latch mount 602. After the tongue 608 passes, the roll bar 604 once again rolls to a position farthest from the wall 618, due to the curved cut of the slots 606.

Figure 25A:
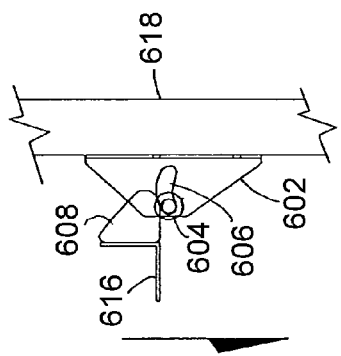
FIGS. 25A-25B illustrate a side view of the embodiment of FIG. 23.
Figure 25B:
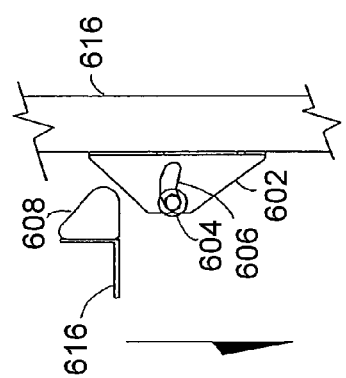

FIGS. 25A-25B illustrate the latch 600 in operation as the lift device moves downward. The tongue 608 moves downward with the lift device until the flat bottom of tongue 608 comes in contact with roll bar 604. Since the bottom of tongue 608 is flat, it is unable to push the roll bar 604 out of its way as with the previously described upward motion. Thus the tongue 608 rests on the roll bar 606 for support. When a user desires to lower the lift device below the latch 600, the user merely pushes the roll bar 604 to the back of the slot 606 and continues to lower the lift.

The latch 600 can be mounted at any height desired by the user. Additionally, the latch mount 602 can be adjustably mounted to allow a user to easily modify the vertical height where the latch 600 activates. Further, multiple latch 600 units may be used with a single lift mechanism, providing added support and safety for larger loads.

Manual RV Trailer Jack

Figure 17:
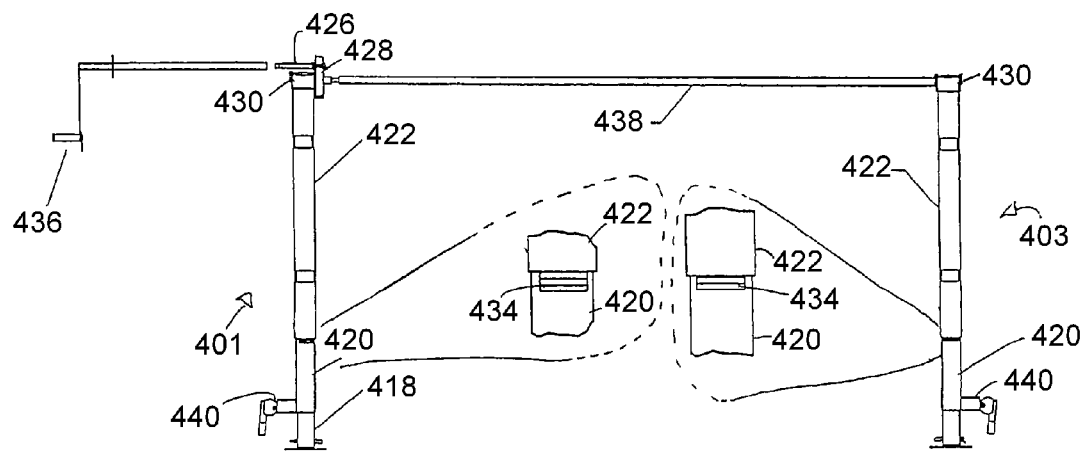
FIG. 17 illustrates a side view of an embodiment of a RV jack according to the present invention.
Figure 18:
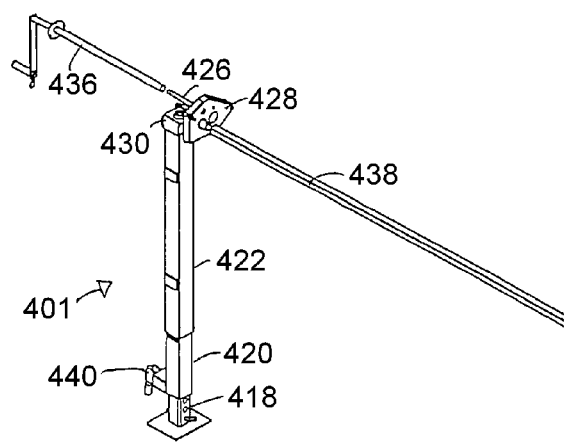
FIG. 18 illustrates a perspective view of the RV jack of FIG. 17.
Figure 19:
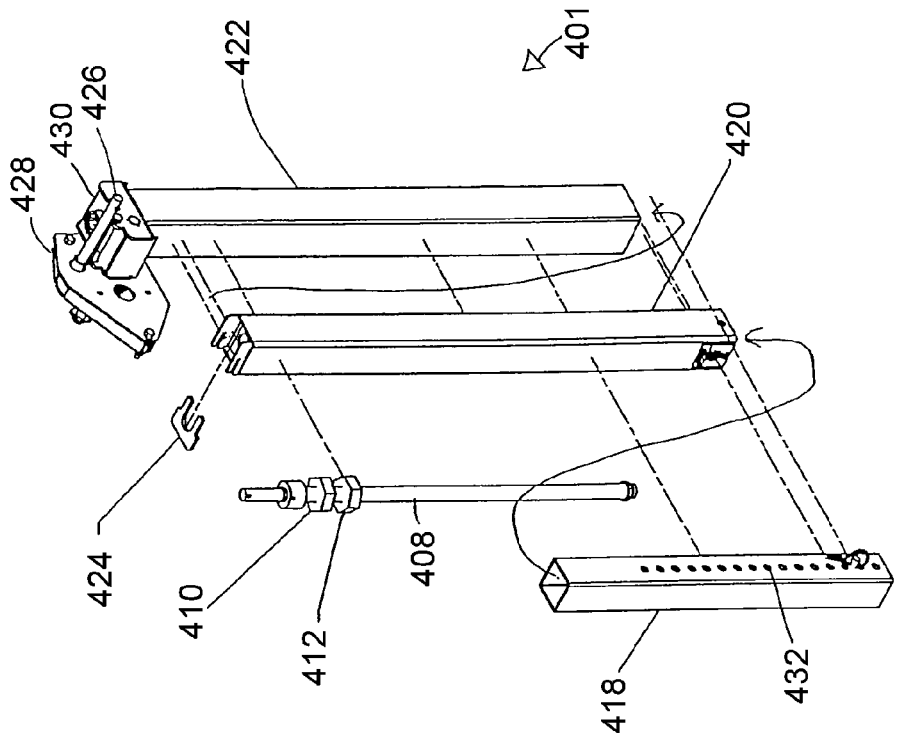
FIG. 19 illustrates a perspective view of the RV jack of FIG. 17.

The lifting device of the present invention may also be used as a trailer jack. FIGS. 17-19 illustrate one of many possible jack embodiments according to the present invention.

Generally, this jack embodiment consists of dual lifting devices 401 and 403 adapted to mount on either side of a RV trailer, such as a fifth wheel travel trailer. These lifting devices may be adapted to swing up against the trailer when not in use and have a mechanism for synchronizing each device for evenly lifting the trailer. Although two lifting devices 401 and 403 are presented in this embodiment, it should be understood that a single lifting device may be used for a similar purpose.

Each lifting device 401 and 403 functions in a similar fashion to previous embodiments. Specifically, a dual acme nut lift mechanism serves to raise and lower the device while also providing visual benchmarks for determining acme nut failure.

Again looking at FIGS. 17-19, each lifting device is composed of three main structural components: drop leg 418, inner leg 420, and jack leg 422. Respectively, each member's girth is slightly larger than the next, making drop leg 418 the smallest girth, inner leg 420 larger, and jack leg 422 the largest girth. Such increasing sizing allows the three members to telescopically fit within each other.

Figure 18A:
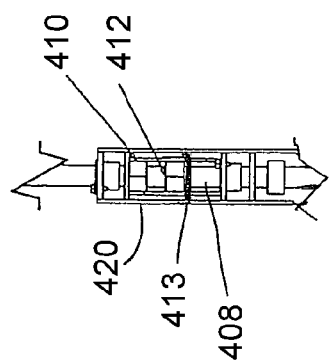
FIG. 18A illustrates a magnified side view of the embodiment of FIG. 17.

Like previous embodiments, a primary acme nut 412 and a secondary acme nut 410 are "captured" or held from rotation around the acme screw 408 by the inner leg 420. As best seen in FIG. 18A, the primary acme nut 412 sits below secondary acme nut 410. The weight supported by the lifting device 401 is mostly channeled through the acme screw 408. To support this subsequent downward pressure of the acme screw 408, primary acme nut 412 is positioned above a circular flange 413 within inner leg 420.

The acme screw 408 passes through the top of inner leg 420 and terminates at the top of jack leg 422 with a gear box 430 which drives the rotation of the acme screw 408. Thus, the gear box 430 ultimately controls the direction of rotation of the acme screw 408 and further the direction that the dual acme nuts travel along it.

The lifting device 401 provides an additional height adjustment mechanism. A handle actuated pin lock 440 is located on the lower end of inner leg 420. By moving the handle, a user may insert or retract a locking pin from within inner member 420. Conveniently located within the drop leg 418 are a series of pin holes 432, spaced along its length. Since the drop leg 418 telescopically slides within the inner leg 420, the pin holes 432 may be aligned with the locking pin. This arrangement allows a user to operate the handle actuated pin lock 440 to unlock the drop leg 418, adjust it to a new position, and finally relock it. Since these height adjustments are independent of each lifting device 401, they are especially appropriate for compensating for uneven ground when parking a trailer.

In order for the trailer jack to properly lift, both lifting devices 401 and 403 must lift at the same rate. The present embodiment accomplishes this by making one of the lifting devices 401 a leader and the other, 403, a follower. This arrangement is most clearly seen in FIGS. 17 and 18. The leader lifting device 401 posses a hand crank 436 coupled to a hand crank mount 428 and a gear box 430. The follower lifting device 403, however, does not contain either of these two accessories.

The gear box 430 is coupled to two additional components: the acme screw 408 and the cross shaft 438. The purpose of the cross shaft is to rotate in unison with the crank shaft 436 and transfer this rotational energy to the gear box 430 on the follower lifting device 403, which ultimately turns the acme screw 408. In this manner, rotating the hand crank 436 actuates both the leader lifting device 401 and the follower lifting device 403 at the same rate.

In operation, the trailer jack works as follows: A user begins to rotate the hand crank 436 in a desired direction. The rotation of the hand crank 436 motivates the gear box 430 which begins rotating the acme screws in both the leader lifting device 401 and the follower lifting device 403 by way of the cross shaft 438. From this point on, each of the two lifting devices operate in the same manner. The acme screw 408 rotates, causing the captured primary acme nut 412 and captured secondary acme nut 410 to press against circular flange 413. As the acme screw 408 rotates, the force on the primary acme nut 412 moves the acme screw 408 upwards relative to the inner leg 418. By rotating the hand crank 436 in the opposite direction, the process is reversed, and the acme screws 408 move inward relative to the inner leg 418. In this manner, inner leg 418 telescopes into and out of jack leg 422, lifting the RV trailer or other load coupled above it.

As previously described in this application, visual benchmarks may be added to this embodiment to warn a user of primary acme nut failure. Visual indicator 434 is best seen in FIG. 17, being placed on inner leg 420. Such a visual indicator 434 is best aligned so as to match up with the bottom edge of jack leg 422 in a fully extended, fully retracted position or both positions.

With a normal functioning primary acme nut 412, the bottom of jack leg 422 will align with a predetermined indicator line on the visual indicator. When the primary acme nut 412 fails, the circular flange moves the failed nut against the secondary acme nut 410, leaving the secondary acme nut 410 to support all the weight of the RV trailer. In this circumstance, the jack leg 422 sits lower relative to the inner leg 420, especially in the absolute positions of fully extended or fully retracted. Consequently, the bottom edge of the jack leg 420 aligns to a lower marker level on the visual indicator 434. FIG. 17 best illustrates this point by showing leader lifting device 401 with a normally aligned visual indicator 434, while follower lifting device 403 shows an alignment indicating a failed primary acme nut 412.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A bed lifting device for a recreational vehicle comprising:
    a first vertical support bracket having a first elongated vertical length;
    a first lifting mechanism located along said first elongated vertical length of said first vertical support bracket;
    a first lifting bracket slidably engaged with said first vertical support bracket and supported by said first lifting mechanism;
    a second vertical support bracket having a second elongated vertical length;
    a second lifting mechanism located along said second elongated vertical length of said second vertical support bracket;
    a second lifting bracket slidably engaged with said second vertical support bracket and supported by said second lifting mechanism;
    a first bed bracket sized to support a bed; said bed bracket connected to said first lifting bracket and said second lifting bracket;
    a third lifting bracket slidably engaged with said first vertical support bracket;
    a fourth lifting bracket slidably engaged with said second vertical support bracket; and,
    a second bed bracket sized to support a bed; said second bed bracket connected to said third lifting bracket and said fourth lifting bracket; wherein said second bed bracket is located above said first bed bracket;
    a shaft coupled to a top end of said first lifting mechanism and to a top end of said second lifting mechanism for distributing motive force between said first lifting mechanism and said second lifting mechanism; and,
    a motor disposed on said bed lifting device so as to drive said first lifting mechanism, said shaft, and said second lifting mechanism;
    wherein said first bed bracket is movable between a lowered position within said vehicle and a raised, stowed position within said vehicle;
    wherein said second bed bracket is uncoupled from said first lifting mechanism and said second lifting mechanism such that movement of said second bed bracket to a raised, stowed position is achieved by said first bed bracket upwardly pushing against said second bracket.

2. The bed lifting device of claim 1, further comprising:
    a first gearbox coupled to a first end of said shaft and said top end of said first lifting mechanism; and
    a second gearbox coupled to a second end of said shaft and said top end of said second lifting mechanism.

3. The bed lifting device of claim 2, wherein said motor is coupled to said first gearbox.

4. The bed lifting device of claim 3, wherein said first lifting mechanism and said second lifting mechanism move in unison.

5. The bed lifting device of claim 4, wherein said first lifting mechanism comprises a first acme screw and said second lifting mechanism comprises a second acme screw.

6. A device for lifting a bed between a lowered position and a raised position comprising:
    a first vertical support bracket having an elongated shape;
    a first lifting mechanism disposed along a vertical length of said first vertical support bracket;
    a second support bracket having an elongated shape;
    a second lifting mechanism disposed along a vertical length of said second vertical support bracket;
    a first bed bracket sized to support a bed; said first bed bracket coupled to said first lifting mechanism and said second lifting mechanism to move said bed bracket between a raised position and a lowered position; wherein said first bed bracket is movable between a lowered position and an elevated position;
    a second bed bracket sized to support a bed; said second bed bracket slidably coupled to said first vertical support bracket and to said second vertical support bracket; wherein said second bed bracket is uncoupled from said first lifting mechanism and said second lifting mechanism in a manner such that movement of said second bed bracket to an elevated position is due to pushing of said first bed bracket upwardly against said second bed bracket;

a distribution mechanism coupled to a top end of said first lifting mechanism and a top end of said second lifting mechanism for transferring motive force to said first lifting mechanism and said second lifting mechanism; and an elongated flexible support secured to said second bed bracket and said first vertical support.

7. The device of claim 6, wherein said first bed bracket further comprises:

a first mounting bracket slidably engaged with said first vertical support bracket and connected to said first lifting mechanism; and a second mounting bracket slidably engaged with said second vertical support bracket and connected to said second lifting mechanism.

8. The device of claim 6, wherein said distribution mechanism is a chain coupled to said first lifting mechanism and said second lifting mechanism for distributing a force between said first lifting mechanism and said second lifting mechanism; wherein movement of said chain in a first direction raises said bed bracket and movement of said chain in a second direction lowers said bed bracket.

9. The device of claim 6, wherein said distribution mechanism is a shaft.

10. The device of claim 6, wherein said first lifting mechanism is a first acme screw and said second lifting mechanism is a second acme screw.

11. A lifting device in a recreational vehicle comprising:

a frame;

a first lifting mechanism secured along a vertical length of said frame;

a second lifting mechanism secured along a vertical length of said frame;

a distribution mechanism coupled to a top end of said first lifting mechanism and a top end of said second lifting mechanism for transferring motive force to said first lifting mechanism and said second lifting mechanism;

a first bracket assemblage slidably disposed on said frame; said first bracket assemblage engaged with said first lifting mechanism to adjust a height of said first bracket assemblage;

a second bracket assemblage slidably disposed on said frame; said second bracket assemblage engaged with said second lifting mechanism to adjust a height of said second bracket assemblage;

said first bracket assemblage and said second bracket assemblage coupled to a first bed bracket sized for supporting a bed;

a third bracket assemblage slidably disposed on said frame;

a fourth bracket assemblage slidably disposed on said frame;

a second bed bracket sized to support a bed and coupled to said third bracket assemblage and said fourth bracket assemblage;

wherein said first bed bracket is movable between a lowered position within said vehicle and raised, stowed position within said vehicle; and, wherein said second bed bracket is located above said first bed bracket, such that said first bed bracket pushes said second bed bracket to an elevated position.

12. The lifting device of claim 11, wherein said first lifting mechanism comprises a first acme screw rotatably disposed to said frame and wherein said second lifting mechanism comprises a second acme screw rotatably disposed to said frame.

13. The lifting device of claim 11, wherein said first bracket assemblage further comprises a first captured nut engaged with said first acme screw; and wherein said second bracket assemblage further comprises a second captured nut engaged with said second acme screw.

14. The lifting device of claim 11, wherein said distribution mechanism comprises a chain coupled to an upper end of said first lifting mechanism and said second lifting mechanism.

15. The lifting device of claim 11, wherein said distribution mechanism comprises a rotatably mounted shaft coupled to an upper end of said first lifting mechanism and said second lifting mechanism.

16. The lifting device of claim 11, further comprising an elongated flexible support secured to said frame and said first bed bracket.

17. The device of claim 11, further comprising a motor coupled to said distribution mechanism.

18. The device of claim 11, further comprising:

a shaft;

a first gear box comprising gears operatively coupled to said shaft and a top end of said first lifting mechanism; and a second gear box comprising gears operatively coupled to said shaft and a top end of said second lifting mechanism;

wherein said shaft synchronizes movement of said first lifting mechanism and said second lifting mechanism.

* * * * *